United States Patent [19]

Krauss

[11] 4,040,582
[45] Aug. 9, 1977

[54] WIND POWER ACCESSORY FOR A VEHICLE WHEEL

[76] Inventor: Ronald C. Krauss, 515 E. 15th St., Grand Island, Nebr. 68801

[21] Appl. No.: 611,816

[22] Filed: Sept. 9, 1975

[51] Int. Cl.² .............................................. B64C 25/36
[52] U.S. Cl. .................................. 244/103 S; 115/71; 115/19; 301/37 CD; 301/37 H
[58] Field of Search .................. 244/103 S; 301/37 R, 301/37 E, 37 CP, 37 S, 37 H, 37 CM, 108 R, 108 S, 37 AT; 220/320; 115/15 A, 19, 1 R

[56] References Cited

U.S. PATENT DOCUMENTS

| 1,459,588 | 6/1923 | Hoffman | 301/108 R |
|---|---|---|---|
| 1,571,134 | 1/1926 | Mittinger | 220/320 |
| 1,985,378 | 12/1934 | Lyon | 301/37 CD |
| 2,305,237 | 12/1942 | Carpenter | 244/103 S |
| 2,312,159 | 2/1943 | Gulotta | 244/103 S |
| 2,333,191 | 11/1943 | Mitton et al. | 244/103 S |
| 2,404,777 | 7/1946 | Gaines | 220/320 |
| 2,408,963 | 10/1946 | Westcamp | 244/103 S |
| 2,443,627 | 6/1948 | Lyon | 301/37 S |
| 2,926,954 | 3/1960 | Lyon | 301/37 R |
| 2,941,758 | 6/1960 | Cordoba | 244/103 S |

Primary Examiner—Trygve M. Blix
Assistant Examiner—Galen L. Barefoot
Attorney, Agent, or Firm—Berman, Aisenberg & Platt

[57] ABSTRACT

A wind-utilization attachment for pneumatic-tired vehicle for automobiles, aircraft wheels, or the like. The attachment consists of an annular disc with spaced cups to catch head winds and convert their forces into rotational torque. The disc is secured to a wheel by opposing arcuate clamping segments having flanges engaged between the tire side wall and the wheel rim, the adjacent ends of the clamping segments being bolted together. A removable cover cap is engaged in the central aperture of the disc, which when removed, provides access to the securing fasteners of the associated wheels.

6 Claims, 5 Drawing Figures

WIND POWER ACCESSORY FOR A VEHICLE WHEEL

This invention relates to wind-utilization devices for vehicles and more particularly to attachments for pneumatic vehicle wheels for converting head wind forces into rotational torque.

A main object of the invention is to provide a novel and improved wind conversion attachment for a pneumatic-tired vehicle wheel, said attachment being simple in construction, having relatively few parts, being easy to install, being neat in appearance, and being substantially theft-proof.

A further object of the invention is to provide an improved wind utilization attachment for pneumatic-tired vehicle wheels which is securely held in operating position, which is relatively compact in size, which is efficient in operation, and which provides substantial fuel saving in the operation of the associated vehicle as well as longer wearing life for the associated tire.

A still further object of the invention is to provide an improved wind-utilization attachment for the wheel of a pneumatic-tired vehicle, the attachment allowing easy and convenient installation of balance weights on the associated wheel, being difficult to remove by thieves or vandals, being relatively inexpensive to manufacture, and being durable in construction.

Further objects and advantages of the invention will become apparent from the following discription and claims, and from the accompanying drawings, wherein:

The concept of utilizing head wind force to develop rotational torque has been employed for rotating the landing wheels of aircraft for landing so as to reduce wear on the wheel tires and to promote smooth contact as the wheels engage a runway. This concept is illustrated, for example, in U.S. Pat. No. 2,305,237 to J. A. Carpenter, U.S. Pat. No. 1,834,427 to C. B. Schumacher and U.S. Pat. No. 1,829,500 to W. Brown. A similar concept is used in U.S. Pat. No. 2,424,941 to R. W. Musser et al., wherein it is applied to automobile wheels. Thus, it is well understood that head wind force can be practically utilized to develop rotational wheel torque and increase the speed, improve the fuel economy, and reduce the wear on the tires of a vehicle.

In the prior art applications of this concept, it has been necessary to employ expensive wheel constructions or special tire configurations in order to obtain the advantages of head wind conversion as above described. A prime purpose of the present invention is to provide a head wind conversion attachment which can be employed with standard wheel and tire designs and which can be readily mounted on ordinary vehicle wheels without interferring with the ability to remove or replace the wheels as required, or with other normal characteristics of standard wheel and tire usage.

Other important aims of the present invention are to provide head-wind conversion wheel attachments which will reduce loading on an automobile engine and allow the engine to operate more efficiently with less fuel consumption, and wherein the wheel attachments can be made from inexpensive durable materials, such as long-life plastic materials which do not rust or corrode and which do not discolor the wheels, and wherein the wheel attachments act to reduce wear on the tires, the attachments being adaptable for use on aircraft wheels to cause the wheels to turn prior to landing, as in the above-mentioned prior patents.

Figure 2:
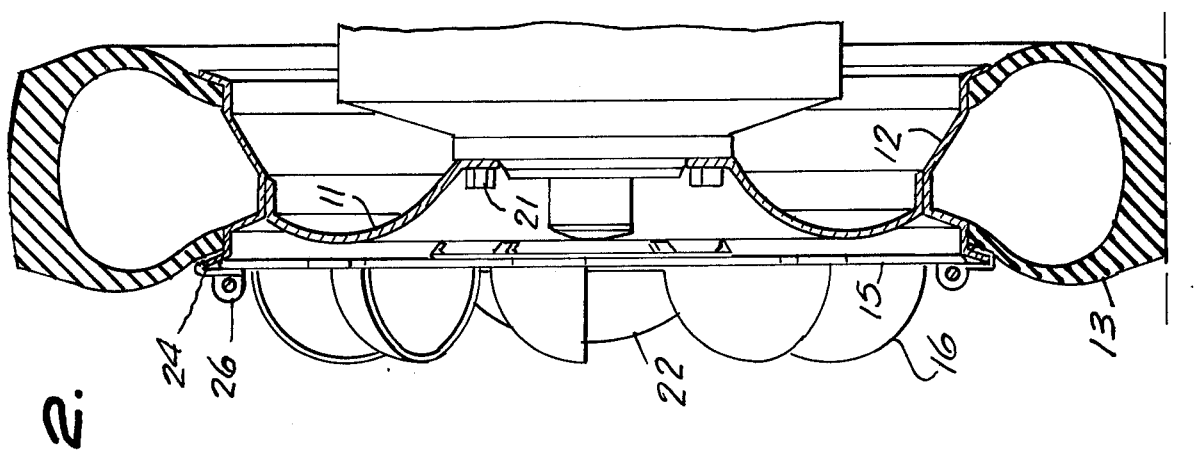
FIG. 2 is an enlarged transverse vertical cross-sectional view taken substantially on the line 2—2 of FIG. 1, showing the wind utilization attachment in end elevation.

Referring to the drawings, 11 designates a conventional automobile wheel having a rim 12 on which is mounted a standard pneumatic tire 13. Designated generally at 14 is a typical head wind torque conversion attachment constructed in accordance with the present invention, shown operatively mounted on the automobile wheel in FIGS. 1, 2 and 5.

The attachment 14 comprises a generally annular disc-like main body 15 of suitable material, such as molded plastic material, rust-resistant metal, or other suitable durable material, formed integrally with a plurality of uniformly spaced, circumferentially arranged cup elements 16, which may be substantially of quarter-spherical shape, and which have open ends 17 all facing in the same direction of rotation, with their edges located substantially in radial planes.

Body 15 is formed with respective peripheral lugs 18 coplanar with the body, aligned radially with the cup elements 16 and substantially of the same circumferential width as said cup elements. The lugs 18 are located so as to be simultaneously engageable on the outside rim flange 19 of a standard wheel rim 12 in the manner illustrated in FIG. 5.

Annular body 15 has a central aperture 20 which is of sufficient size to expose the wheel fastening bolts 21. A removable hub cap element 22 is provided, with resilient catch lug rim portions 23, so that the hub cap 22 is lockingly engageable in the aperture 20 so as to normally cover the center area of the wheel containing said fastening bolts 21, but which is readily removable to allow access thereto.

Figure 5:
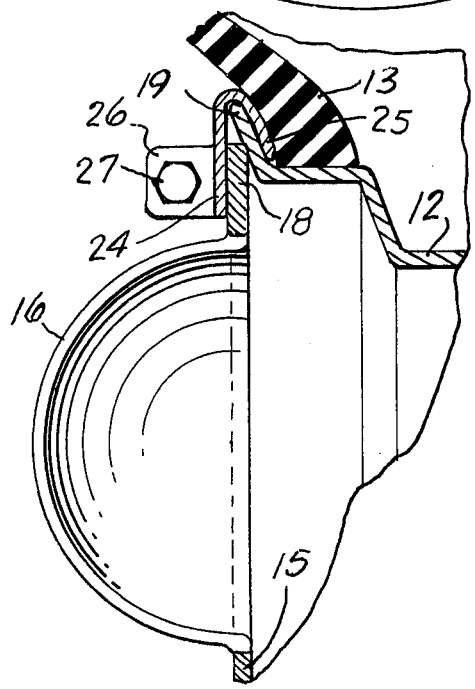
FIG. 5 is an enlarged fragmentary vertical cross-sectional view taken substantially on the line 5—5 of FIG. 1.

A pair of opposed generally semi-circular clamping bars 24, 24 are provided, having arcuately curved peripheral flanges 25 receivable between the rim flange 19 and the side wall of the associated tire 13, as shown in FIG. 5. The clamping bars 24 are engageable on the lugs 18, as shown, and have apertured outwardly extending end lugs 26 adapted to receive fastening bolts 27 provided with nuts 28 in the manner shown in FIG. 1, so as to fasten the adjacent ends of the clamping bars together and thus clamp the body 15 concentrically to the wheel rim flange 19.

The lugs 18 are spaced apart sufficiently so as to define notch-like edge portions therebetween with clearance for wheel balancing weights 29 when such weights are employed with the associated wheel. The clamping bars 24 are clampingly engageable with the balancing weights.

The flanges 25 are clamped between the tire side wall and the inner surface of wheel rim flange 19, as shown in FIG. 5, so that the clamping bars 24 cannot easily be removed by unauthorized persons, thereby substantially preventing easy theft of the attachment 14.

The attachment 14 is mounted on the wheel prior to inflation of the tire 13 so that when the clamping bars 24 are fastened together, clamping the lugs 18 against the wheel rim flange 25, and the tire is subsequently inflated, the attachment is firmly locked to the associated wheel.

Figure 1:
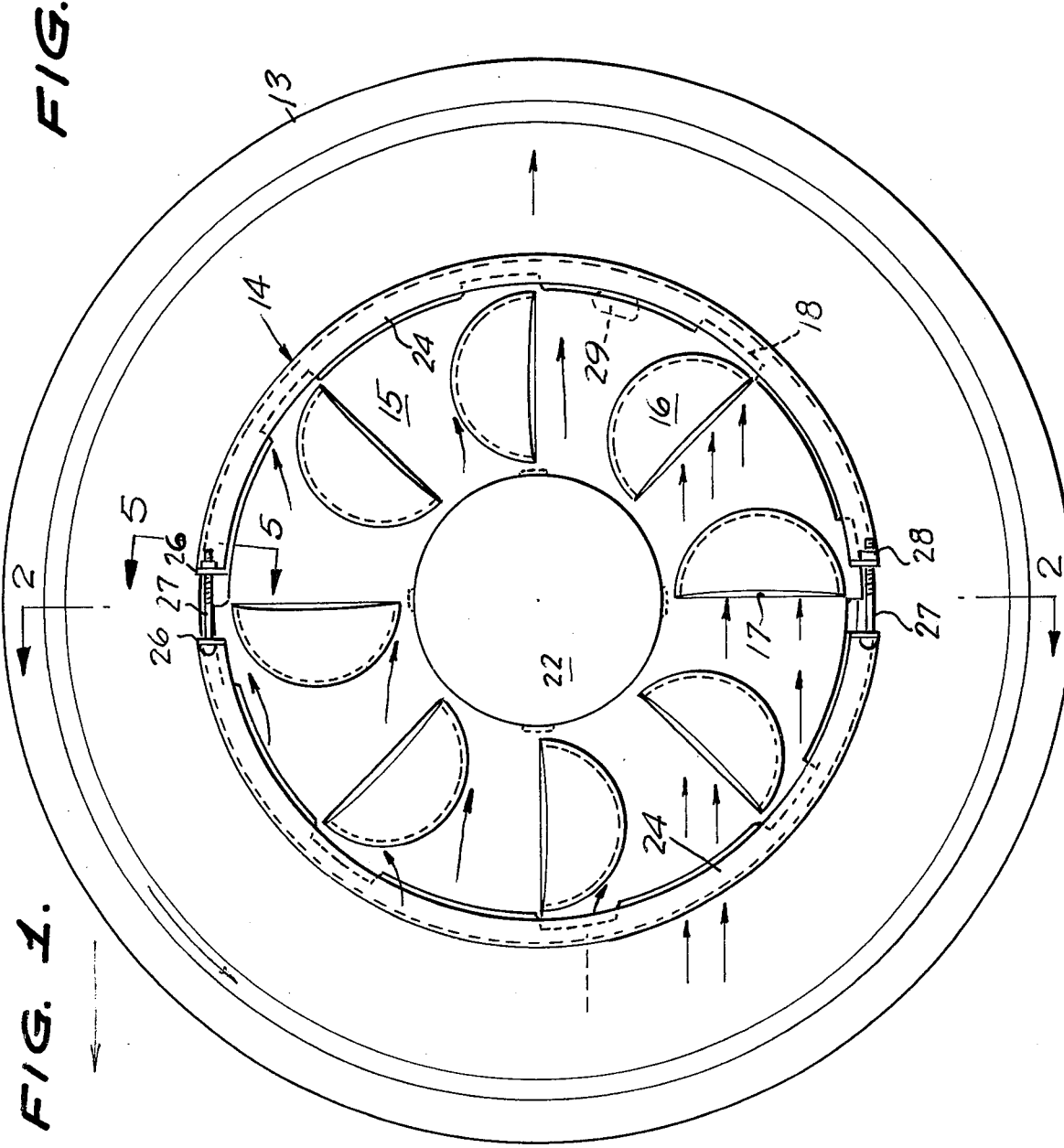
FIG. 1 is a side elevational view of an assembled wind-utilization attachment constructed in accordance with the present invention, installed on a vehicle wheel.
Figure 3:
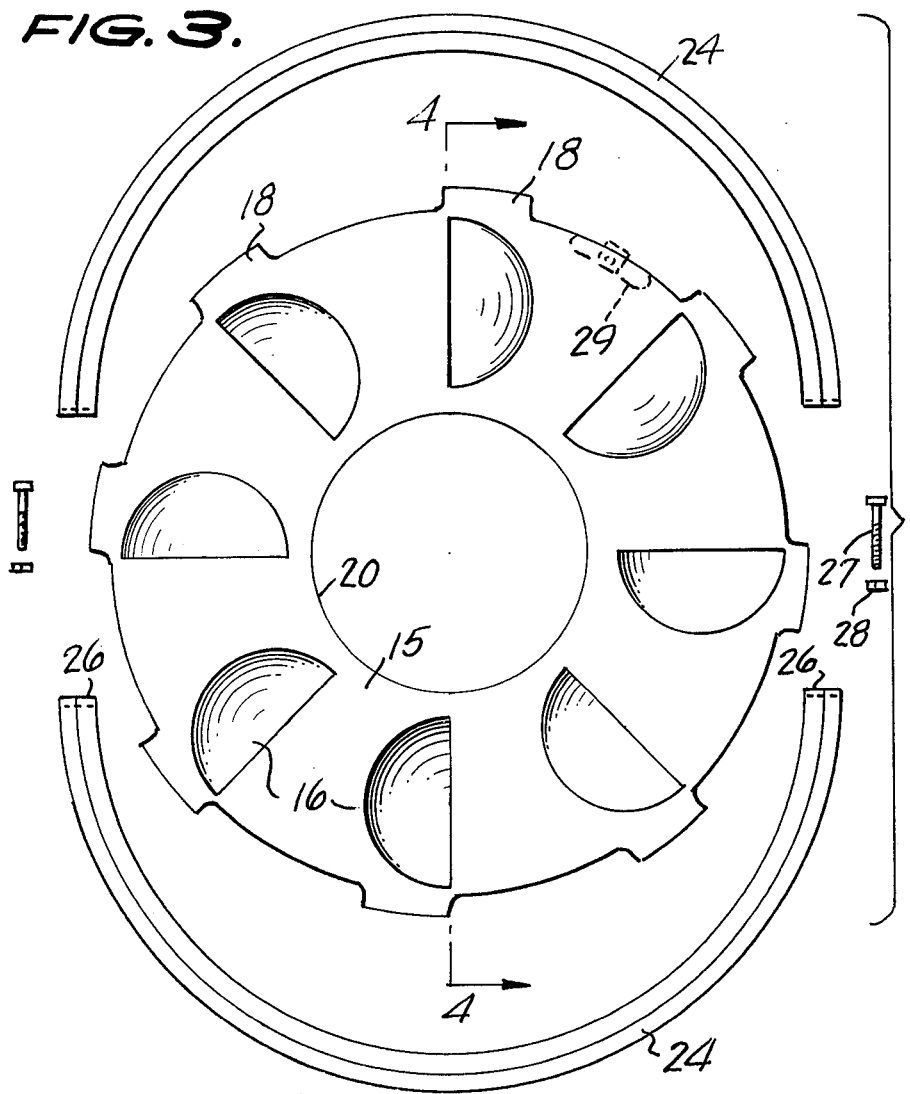
FIG. 3 is a side elevational view of the wind utilizational attachment of FIGS. 1 and 2 with its parts in separated positions.
Figure 4:
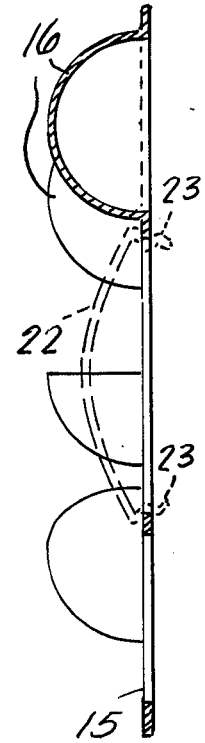
FIG. 4 is a transverse vertical cross-sectional view taken substantially on the line 4—4 of FIG. 3.

As the wheel rotates counterclockwise, assuming the vehicle to be traveling leftwards, as viewed in FIG. 1, wind force acting on the forwardly facing lower cup members 16 generates counterclockwise driving torque on the wheel and assists the vehicle engine, thereby reducing the load on the engine, increasing the vehicle speed, and promoting better tire traction, as well as improved tire wear characteristics. The forwardly convex top cup surfaces allow the wind currents to move smoothly therepast and do not appreciably retard rotation of the associated wheel.

While a specific embodiment of an improved wind-utilization wheel attachment has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A wind-utilization attachment for a vehicle wheel of a type having a flanged rim and a pneumatic tire seated on said rim with securing means at the inner portion of the wheel, said attachment comprising a main body engageable in the wheel and having a central aperture through which said wheel securing means are accessible and having peripheral portions engageable with a rim flange, spaced cup members on said main body facing in the same direction of rotation, and clamp means engageable over said peripheral portions and said rim flange for securing said main body to said rim flange, wherein said peripheral portions of the main body comprise spaced integral lugs engageable on the rim flange, and wherein said clamp means comprises a pair of substantially semi-circular clamping bars engageable on said spaced lugs and having flanges receivable between said rim flange and the adjacent side wall of the pneumatic tire.

2. The wind-utilization attachment of claim 1, and a cover cap lockingly and removably engaged in said central aperture.

3. The wind-utilization attachment of claim 1, and wherein said clamping bars are provided at their ends with apertured lugs and with connecting bolts engaged through said apertured lugs.

4. The wind-utilization attachment of claim 1, and wherein said cup members are substantially of quarter-spherical shape.

5. The wind-utilization attachment of claim 1, and wherein said spaced integral lugs engaged on the rim flange define notch-like edge portions therebetween, and further comprising at least one balancing weight secured on an edge portion.

6. The wind-utilization attachment of claim 5, and wherein one of said clamping bars lockingly engages said balancing weight.

* * * * *